US005495335A

United States Patent [19]
Cote

[11] Patent Number: 5,495,335
[45] Date of Patent: Feb. 27, 1996

[54] RING LASER GYROSCOPE WITH A NON-LOSS INDUCING MODE SUPPRESSION MECHANISM

[75] Inventor: Laurence G. Cote, Thousand Oaks, Calif.

[73] Assignee: Litton Systems, Inc., Woodland Hills, Calif.

[21] Appl. No.: 334,009

[22] Filed: Apr. 5, 1989

[51] Int. Cl.⁶ .............................. G01B 9/02; H01S 3/083
[52] U.S. Cl. ............................................ 356/350; 372/94
[58] Field of Search ................................ 356/350; 372/94

[56]         References Cited

U.S. PATENT DOCUMENTS

| | | | |
|---|---|---|---|
| 4,494,873 | 1/1985 | Perlmutter et al. | 356/350 |
| 4,519,708 | 5/1985 | Perlmutter et al. | 356/350 |
| 4,627,732 | 12/1986 | Braun et al. | 356/350 |

OTHER PUBLICATIONS

"Effect of Gain Saturation on the Oscillating Modes of Optical Mazers" by Fox and Li IEEE Journal of Quantum Electronics, vol. QE–2, No. 12, pp. 774–783 Dec. 1966.

Gas Lasers by Arnold L. Bloom (Copyright 1968 by John Wiley & Sons, Inc.) pp. 82.85.

Optical Electronics by Amnon Yariv (Copyright 1985 by CBS College Publishing pp. 140–143.

*Primary Examiner*—Stephen C. Buczinski
*Attorney, Agent, or Firm*—L. David Rish; James F. Kirk; Chester E. Martine, Jr.

[57]            ABSTRACT

Disclosed herein is an apertureless ring laser gyroscope which achieves higher order transverse mode suppression without the use or need for a restrictive aperture that can be a source of unwanted scatter. Such mode suppression is achieved by operating the ring laser gyroscope in a higher pressure range (from 12 to 18 torr) than the range normally considered for ring laser gyroscope operation. Through the mechanism of pressure broadening and mode competition, the lower order $TEM_{00}$ mode remains the only transverse mode present in the optical cavity of the ring laser gyroscope.

11 Claims, 2 Drawing Sheets

1

RING LASER GYROSCOPE WITH A NON-LOSS INDUCING MODE SUPPRESSION MECHANISM

BACKGROUND OF THE INVENTION

1. Field of the Invention

This invention relates to ring resonators, and more particularly to an apertureless ring laser gyroscope capable of suppressing all transverse modes except the fundamental Gaussian mode ($TEM_{00}$).

2. Description of the Related Art

Modern inertial navigation includes rotational sensors capable of wide dynamic rate sensing range, high reliability, and rapid reaction time. Mechanical gyroscopes meet some of these capabilities, but exhibit problems associated with shock and vibration. Additionally, mechanical gyroscopes have relatively long warm-up times and limited high rate sensing capability. Ring laser gyroscopes have been developed which constitute the laser analog of the Sagnac experiments for detecting rotation rate by means of counter propogating light beams.

Ring laser gyroscopes have an optical pathway arranged in a polygonal configuration defined by three or more mirrors. The optical pathway may be confined to a cavity defined within a monolithic glass block frame. FIG. 1 shows an example of a monolithic block ring laser gyroscope frame 10 which defines an optical pathway through cavity legs 12, 14, 16, and 18. Measurements of rotation rate are made (in this prior art gyroscope) by using the lasing characteristics of an optical cavity. The cavity legs 12, 14, 16 and 18 are filled with a gaseous active laser medium such as a mixture of Helium and Neon. Usually, the gaseous laser medium is maintained at a pressure of no more than 7–11 torr. Four mirrors, 20, 22, 24 and 26, are sealed to four mirror mounting surfaces of the frame 10 in a typical embodiment shown in FIG. 1. The gyroscope frame 10 may be mounted onto a mounting post 28 made of a strong and resilient metal such as INVAR.

The laser gyroscope of FIG. 1 may include a group of elements for exciting the active medium. These may include a cathode 30 and a set of anodes 32 and 34, symmetrically positioned about the cathode 30, forming the DC discharge system. The active region between anode 34 and cathode 30, as well as the active region between anode 32 and the cathode 30, comprise the excited active medium source that is used to stimulate the lasing action needed to create at least two counter propagating longitudinal modes of light needed to measure rotation. An output prism 36 may be used to optically heterodyne counter propagating modes in order to measure rotation.

It will be noted that in a prior art gyroscope, as shown in FIG. 1, at least one leg 12 of the optical pathway cavity has a restricted aperture 38. The purpose of this aperture 38 is to suppress all higher order transverse modes other than the dominant Gaussian $TEM_{00}$ mode. (When referred to in this application the $TEM_{00}$ mode is also referred to as the fundamental or Gaussian mode).

It is heretofore known that, to achieve optimum performance, a laser cavity of a ring laser gyroscope should be designed, constructed, and aligned which supports only one transverse mode. This is true because the beam should have only one intensity maximum in its energy cross-section. Oscillation is desired in a single transverse mode, such as the gaussian or the lowest order mode ($TEM_{00}$). In the prior art (FIG. 1) an aperture 38 is used suppress all modes but the one transverse $TEM_{00}$ mode that is present in the optical cavity 12. This mode is characterized by minimal cross-section at the mirrors and other optical elements creating minimal backscatter. In order that the laser oscillates in the fundamental $TEM_{00}$ mode, a limiting aperture 38 is introduced in the ring resonator so that all modes, except $TEM_{00}$, have diffraction losses which overcome the available gain of the active medium. The operation of the aperture 38 of FIG. 1 is better understood by reference to FIG. 2, which is a prior art graphic representation illustrative of gain plotted as a function of frequency. The fundamental $TEM_{00}$ transverse mode is shown to have a gain curve 50 which exists substantially above the gain threshold line 54, allowing this $TEM_{00}$ transverse mode to lase at its resonant frequency 58. This $TEM_{00}$ curve 50 is characterized by hole-burning at the lasing frequency 58.

The aperture 38 (FIG. 1) causes a differential loss between the gain threshold lines 56 and 54. Line 56 is associated with the higher order mode $TEM_{01}$, and the gain curve 52 representing that higher order $TEM_{01}$ mode. It will be noted that gain curve 52 is entirely below its gain threshold line 56 and therefore the ring laser gyroscope does not support lasing at this off-axis mode. Thus, the conventional aperture 38 does achieve tranverse mode suppression, in the manner described herein and illustrated in FIG. 2.

Although a conventional aperture 38 in the optical cavity 12 (FIG. 1) achieves tranverse mode suppression, it does so with certain costs to gyroscope performance. Foremost among the aperture effects which reduce gyroscope performance is the increased loss and scatter in the optical cavity. It is well-known that an aperture positioned within the optical cavity of a ring laser gyroscope contributes to both forward scatter and backscatter between the two counter-propagating modes within the ring resonator cavity. Backscatter is detrimental to gyroscope performance, since it is a source of gyro scale factor nonlinearities. Thus, a transverse mode suppression technique and structure which eliminates the aperture, would be useful to reduce scatter.

Additionally, an aperture 38 as shown along the cavity 12 of the gyroscope frame 10 (FIG. 1) is difficult to fabricate, in light of the severe tolerances required during the ring laser gyroscope manufacturing process. Difficult fabrication also is indicative of higher cost. Thus, it would be useful if another mechanism could be found which could achieve higher order transverse mode suppression without the defects and drawbacks of the conventional aperture 38.

One attempt at suppressing undesired modes is illustrated in U.S. Pat. Nos. 4,519,708 and 4,627,732, both assigned to Raytheon Company of Lexington, Mass. In these patents, an aperture is formed on the surface of the mirror using a dielectric material comprising a plurality of layers which purport to absorb light waves and scatter. However, these patents disclose a system which necessarily makes at least some contribution to scatter in the optical cavity and therefore represent a partial solution to the problem of unwanted scatter. Another patent taught placing a device in the optical pathway of a ring laser gyrosocope for purposes of light absorption (U.S. Pat. No. 4,494,873, also assigned to Raytheon Company). Additionally, investigations have been made as to the effect of gain saturation on the oscillating modes of optical resonant cavities. See "Effect of Gain Saturation on the Oscillating Modes of Optical Mazers" by Fox and Li, IEEE Journal of Quantum Electronics, Vol. QE-2, No. 12, page 774–783 (December 1966).

SUMMARY OF THE INVENTION

An apertureless ring laser gyroscope, that still can achieve transverse mode suppression of higher order modes, will provide improved gyroscope performance and reduced fabrication costs for gyroscope manufacturing.

This invention is directed to a ring laser gyroscope not having an aperture but capable of achieving higher order tranverse mode suppression. Such mode suppression is achieved by increasing the pressure of the gaseous medium within the optical cavity from its normal of approximately 7–11 torr to a range of 12 to 18 torr. This raising of the gaseous medium pressure within the optical cavity of a ring laser gyroscope increases the number of available gain atoms available to all transverse modes present in the optical resonator cavity through the mechanism of pressure or homogeneous broadening. By raising the pressure of the gaseous medium, degenerate transverse mode suppression is achieved since fewer gain atoms are available to the higher loss off axis tranverse mode due to mode competition effects between fundamental lower order transverse modes and the higher order, degenerate transverse modes. (It is known that a laser will preferentially lase in that mode where the gain to loss ratio is highest. This effect is called mode competition.) As the pressure is increased, the lower order, on-axis higher gain mode is preferred to lase at the expense of the off-axis higher modes. Eventually, the off-axis mode will no longer lase.

A ring laser gyroscope made according to this invention comprises in combination a closed optical pathway defined by a plurality of reflective surfaces enclosing the pathway. Also included is a system for adjusting differential gain of selected transverse modes of the electro-magnetic radiation generated by an active medium positioned within a closed optical pathway. This means of adjusting differential gain of selected transverse modes of electro-magnetic radiation includes an active medium that is kept at a relatively high pressure condition. The range of such pressure condition for active medium may be between 12 and 18 torr.

By maintaining the active gain medium at a relatively high pressure, mode competition is promoted between the Gaussian and higher order transverse modes of electro-magnetic radiation. Off-axis mode suppression is achieved without resorting to an aperture within the cavity. Considerable cost savings in the manufacture of a ring laser gyroscope may result from use of this invention. Back and forward scatter is substantially reduced by successfully eliminating the aperture of a ring laser gyroscope. Generally, raising the active medium pressure to within a range of 12 to 18 torr is sufficient to provide the necessary transverse mode suppression of the off-axis higher order transverse modes within the ring laser gyroscope cavity.

DETAILED DESCRIPTION OF THE PREFERRED EMBODIMENT

Figure 1:
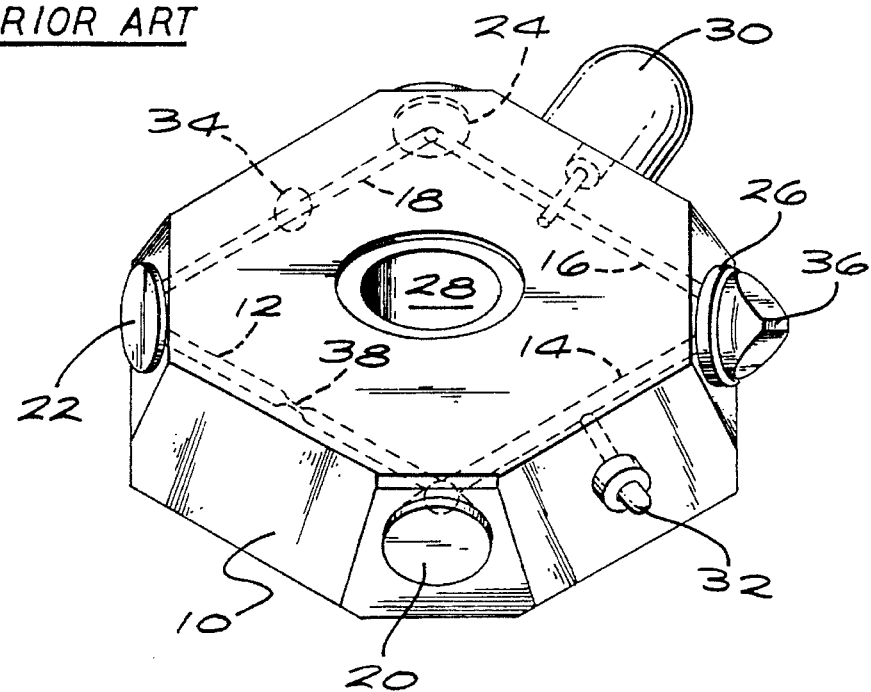
FIG. 1 is a prior art perspective view of a ring laser gyroscope which uses a monolithic frame 10 and has an aperture 38 within one of its cavity legs 12.
Figure 3:
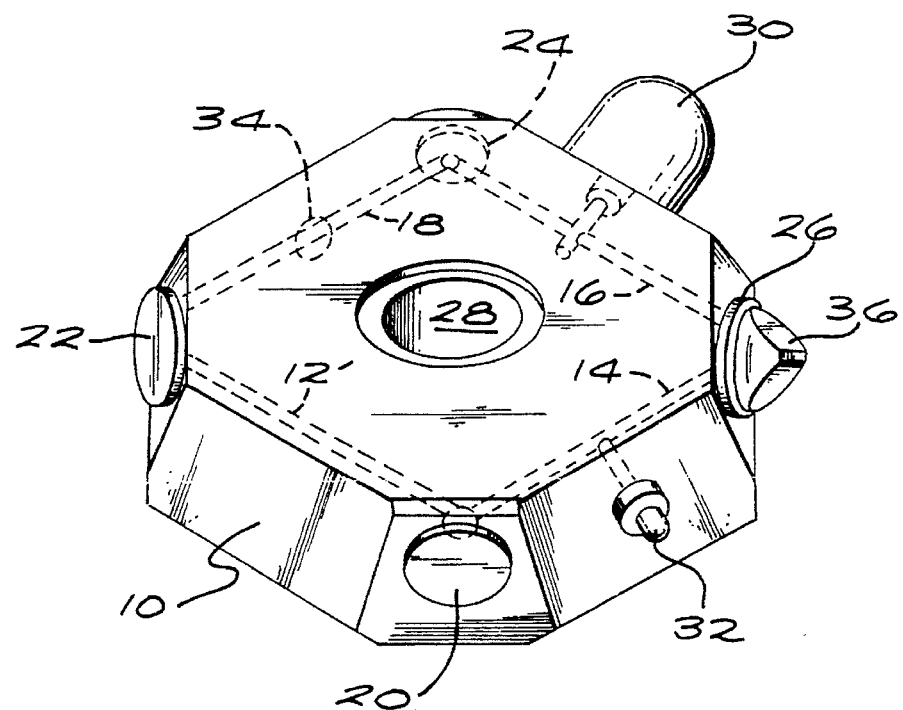
FIG. 3 is a perspective view of the apertureless gyroscope of this invention.
Figure 2:
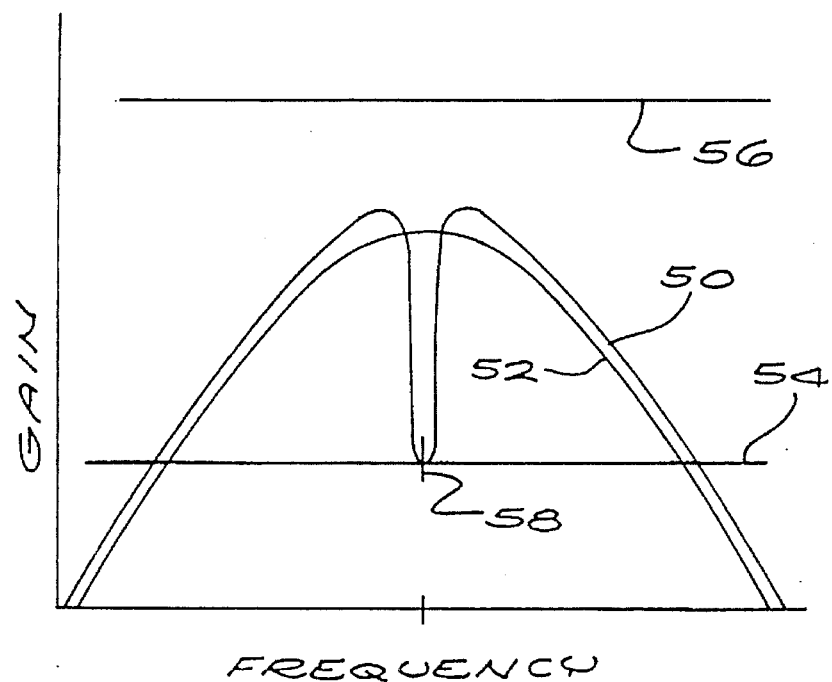
FIG. 2 is a graph which illustrates the operation of the prior art aperture 38 of FIG. 2.

With reference to FIG. 3, there is shown a ring laser gyroscope similar to the gyroscope of FIG. 1 previously described, except that the ring laser gyroscope of FIG. 3 shows no aperture along cavity leg 12' or anywhere in the laser cavity. FIG. 3 shows the gyroscope as finally sealed; however, prior to filling the ring laser cavity 12', 14, 16 and 18 with gaseous active medium, a removable aperture is longitudinally inserted into one of the cavity legs along its axis in order to properly align the optical source and the mirrors (during manufacture only). Once this alignment is achieved, the insertable alignment aperture is removed prior to final assembly and sealing of the ring laser gyroscope. The pressure of the gaseous medium was raised in the cavity legs of the instrument before the gyroscope is sealed.

Figure 4:
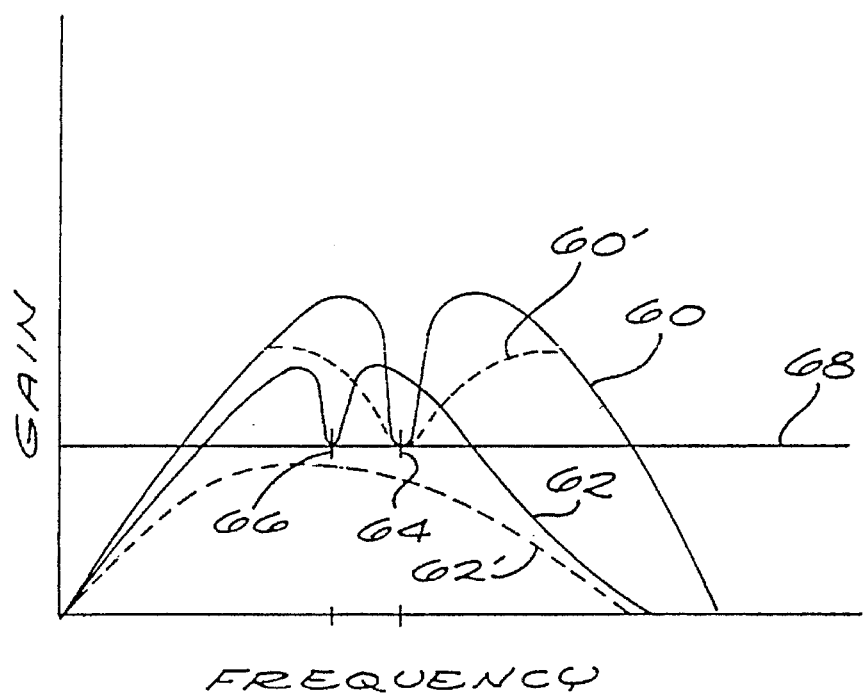
FIG. 4 shows a graphic representation illustrating the operation of the high pressure, apertureless ring laser gyroscope shown in FIG. 3.

In the subject invention, transverse mode suppression is achieved through homogeneous broadening of the gain curve, such that few gain atoms are available for the higher loss off-axis transverse mode 62 and 62' of FIG. 4. Gain curve 60 is the dominant $TEM_{00}$ gain curve before pressure broadening; curve 60' is this dominant curve after the pressure broadening is introduced. Gain curve 62 is representative of the higher order transverse gain curve $TEM_{01}$ before pressure broadening, while lasing about the resonant frequency 66 (where line 68 represents the lasing threshold). Curve 62' is the $TEM_{01}$ mode after gain medium pressure is raised. Homogeneous pressure broadening of the gain curves 60 and 62 promote mode competition such that fewer atoms become available for the higher loss, off-axis transverse modes ($TEM_{01}$). Fewer atoms remain available to the off-axis mode. As the gain to loss ratio becomes lower, the dominant on-axis gain mode will preferably lase at the expense of the off-axis mode, all without the need for an aperture. At some pressure, the off-axis mode will no longer lase, as shown at 62' of FIG. 4. The dominant transverse mode 60 lases at its resonant frequency 64. As the pressure broadening is introduced to the optical cavity of the ring laser gyroscope, the homogeneously broadened dominant transverse mode 60' shows the effects of broadening while continuing to lase about the resonant frequency 64. The higher order degenerate transverse mode however, (illustrated by gain curve 62') no longer lases about its resonant frequency 64. Thus, the $TEM_{01}$ higher order degenerate transverse mode is suppressed without the use of an aperture. This pressure broadening mechanism allows the achievement of higher order transverse mode suppression without the need for a scatter producing aperture along the optical cavity bore. Rather than adjusting differential loss between the gain curves as is the case with an aperture, the subject invention provides a means through pressure broadening for the adjustment of differential gain between transverse modes of the ring laser gyroscope cavity as a primary mechanism of mode suppression.

It can therefore be seen that an apertureless transverse mode suppression technique may be achieved resulting in an apertureless ring laser gyroscope having significantly reduced scatter within its optical cavity. While a preferred embodiment of the invention has been shown and operationally described, it is apparent to those with skill in the art that alternative pressure broadening techniques may be available to achieve an apertureless ring laser gyroscope with full transverse mode suppression. For example, if the ratio of the helium and neon gases in a ring laser gyroscope are altered, it may be possible to operate a ring laser gyroscope in a different higher range of pressures than the 12 to 18 torr range disclosed herein. Therefore, it is intended that alternative equivalent embodiments of the invention are comprehended in the appended claims that follow.

What is claimed is:

1. A ring laser gyroscope, comprising, in combination:

a closed optical pathway defined by a plurality of reflective surfaces enclosing said pathway and positioned along a portion of its extent through an active medium, and, non-loss inducing mode suppression means for adjusting differential gain between selected transverse modes of electromagnetic radiation generated by the active medium;

whereby, off-axis transverse mode suppression is achieved without resort to an aperture in said pathway.

2. The ring laser gyroscope of claim 1, wherein: said means for adjusting differential gain of selected transverse modes of electromagnetic radiation includes an active medium kept at a high pressure condition.

3. The ring laser gyroscope of claim 2, wherein the high pressure condition for the active medium is held in the range of 12 to 18 torr.

4. A ring laser gyroscope, comprising:

a closed optical pathway within a monolithic frame, said pathway defined by a central cavity and a plurality of mirrors positioned to define a ring resonator;

gaseous active gain medium filling said central cavity of said monolithic frame;

said active gain medium maintained at a relatively high pressure to promote mode competition between the gaussian and higher order transverse modes of electromagnetic radiation generated by said active medium; wherein, off-axis mode suppression is achieved without resorting to an aperture within said cavity.

5. The ring laser gyroscope of claim 4, wherein;

said active medium pressure is set within a range of 12 to 18 torr.

6. A method of manufacturing a ring laser gyroscope, said gyroscope being formed from a monolithic frame and defining a closed optical pathway, said pathway having at least three mirrors therealong, the steps of manufacture including:

drilling out at least three longitudinal cavities connecting said mirrors, said cavities having substantially equal cross-sectional diameters;

musket loading an insertable removable aperture for aligning said mirrors;

removing said insertable aperture after mirror alignment;

introducing active medium gas into said cavities at about 12 to 18 torr pressure and sealing said mirrors onto said frame;

wherein, a ring laser gyroscope is manufactured which includes an apertureless optical pathway.

7. In a ring laser, including a laser block having conduits therein for enclosing laser gas, corner mirrors for said conduits to reflect laser light in a closed path, one of said mirrors being partly transmissive to deliver a portion of said laser light external of said laser, said conduits and corner mirrors being configured to support multiple modes of laser oscillation, the improvement comprising:

said laser gas having a sufficiently high pressure that it suppresses all except one of said oscillation modes.

8. A ring laser gyroscope, comprising, in combination:

a closed optical pathway defined by a plurality of reflective surfaces enclosing said pathway; and, a low loss inducing means for adjusting differential gain between selected transverse modes of electromagnetic radiation generated by an active medium captured with said closed optical pathway;

whereby, off-axis transverse mode suppression is achieved without resort to an aperture in said pathway.

9. The ring laser gyroscope of claim 8, wherein:

said low loss inducing means for adjusting differential gain of selected transverse modes of electromagnetic radiation includes an operational state in which the active medium is kept at a relatively high pressure condition.

10. The ring laser gyroscope of claim 9, wherein the high pressure condition for the active medium is held in the range of 12 to 18 torr.

11. The ring laser gyroscope of claim 7, wherein:

the sufficiently high pressure of said laser gas that suppresses all except one of said oscillation modes is held in the range of 12 to 18 torr.

* * * * *